April 27, 1965   G. C. PATROS   3,180,249
METHOD OF COMPACTING, SEGMENTING AND CLEANING SCRAP METALS
Filed Nov. 12, 1963
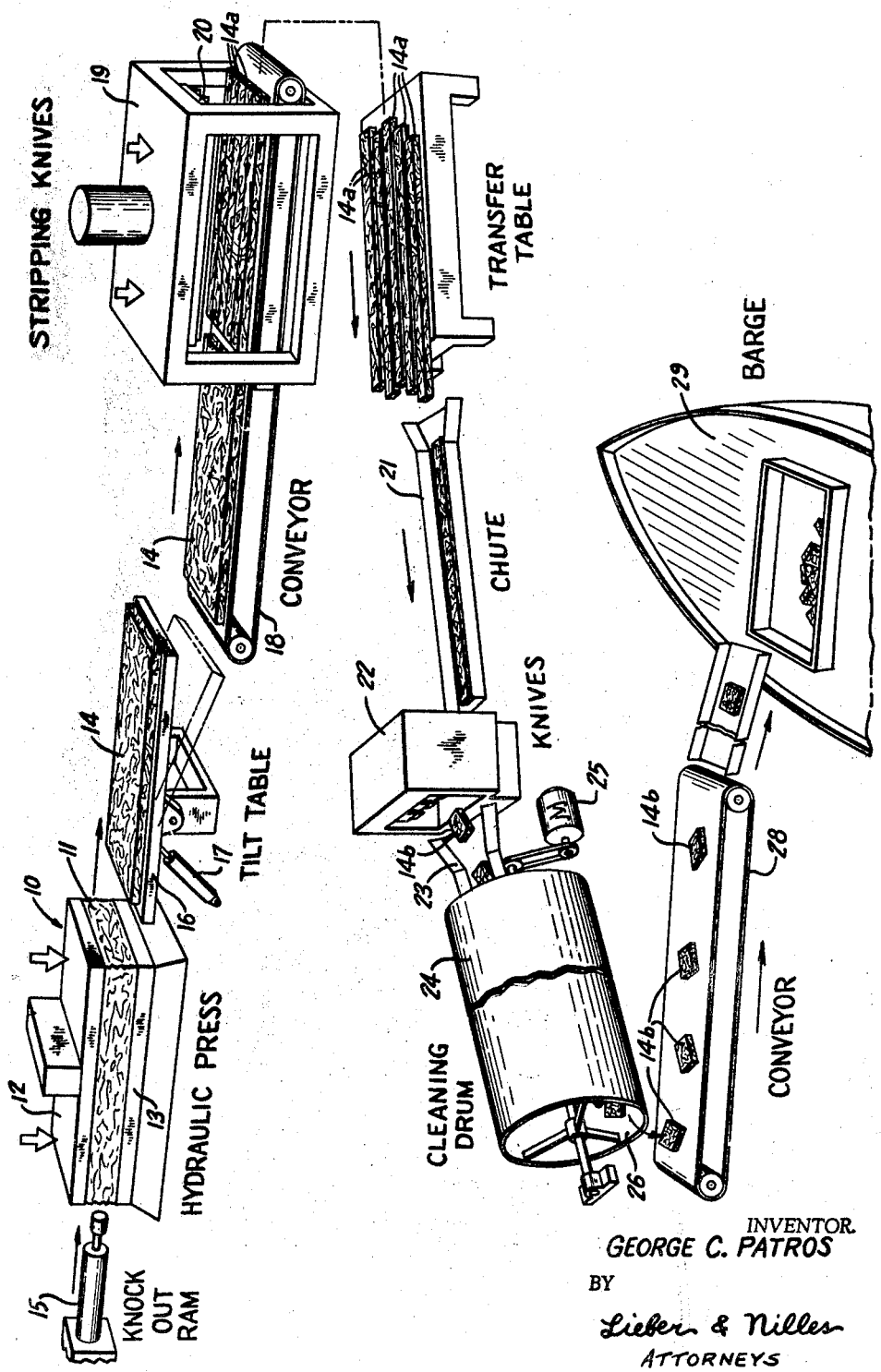
INVENTOR.
GEORGE C. PATROS
BY
Lieber & Nilles
ATTORNEYS

United States Patent Office 3,180,249
Patented Apr. 27, 1965

3,180,249
METHOD OF COMPACTING, SEGMENTING AND CLEANING SCRAP METALS
George C. Patros, 2771 George St., La Crosse, Wis.
Filed Nov. 12, 1963, Ser. No. 322,979
3 Claims. (Cl. 100—39)

This invention relates to a method for preparing scrap metal for steel mill consumption, and more particularly relates to transforming discarded automobile bodies into compact, clean segments of steel scrap of a grade known as No. 1 Bushling, or No. 1 Deep Draw Steel.

A primary object of this invention is to provide an improved method of transforming scrapped automobile bodies into segments of steel scrap which may be readily cleaned for use in a steel mill or the like.

It is known in the prior art that automobile bodies and the like may be burned to remove most of the organic material and then the bodies are subjected to a drop hammer or the like to form them into large awkward bundles or billets. Such bundles of scrap metal are difficult to handle, and are ordinarily not in a condition to be used in a steel mill process without further cleaning, sorting, handling or the like.

Prior art Patent No. 2,059,229 discloses a method of shredding the automobile metal and then compacting the shredded metal in a baling press to constitute a quality of scrap metal corresponding substantially to so called "heavy scrap."

The present invention relates to a method of first forming a single "plate" of the scrap metal as by hydraulic pressure in a forging press or the like. Thus this step transforms an entire automobile body, with or without frame, which has first been subjected to intense burning to eliminate the organic material from the body, into a compact "plate," which may be approximately 4 inches thick, 68 inches wide, and up to 20 feet in length depending on the initial size of the automobile body subjected to the compacting action of the forging press. The compacted body "plate" is then transferred to a stripping or squaring shear where the "plate" is sheared or cut into a plurality of longitudinal slabs, which individually may be approximately 8 inches wide. These "plate" slabs are individually directed into segment shears wherein the slabs are cut into "plate" segments which may be approximately 8 inches by 7 inches in measurement.

The "plate" segments are easily conveyed or transferred to a rotating tumbler wherein tumbling of the "plate" segments effectuates a cleaning action on the individual segments. Sand blasting or other cleaning methods may be introduced during the tumbling action to aid in the cleaning of the segment, such as shot, stars, or re-bars.

It is therefore an additional object of this invention to provide an improved method for compacting, segmenting, and cleaning scrap metal for delivery to a steel mill or the like.

It is another object of this invention to provide a method of transforming bulky automobile bodies into compact, easily handled, "plate" segments that are adaptable to tumbler cleaning prior to delivery to a steel mill or the like.

It is a further object of this invention to provide an improved method for transforming scrap automobile bodies or the like into compact segments of a grade of scrap known as No. 1 Bushling or No. 1 Deep Draw Steel.

It is another object of this invention to provide a method for efficiently transforming scrap automobile bodies or the like into metal segments adaptable to cleaning by tumbling or the like.

These and other objects and advantages of the invention will become apparent from the following detailed description.

A clear conception of the several features constituting the present invention may be had by referring to the drawing accompanying and forming a part of this specification, wherein like reference characters designate the same or similar parts in the various views.

The single figure of the drawing diagrammatically illustrates the method of the invention.

While the improved method is shown and described herein as being especially, advantageously applied to scrap automobile bodies, it is not intended to thereby unnecessarily limit or restrict the invention as the method may be used to like advantage on other types of scrap. It is also contemplated that certain descriptive terminology used here in shall be given the broadest possible interpretation consistent with the disclosure.

Referring to the drawings, the number 10 designates generally a hydraulically operated baling or forging press for applying a crushing force to a scrap automobile body 11 located between crushing jaws 12 and 13, such press being of any commercially available type suitable for the intended purpose. Ordinarily, the body will have been burned to eliminate organic material from the automobile body prior to the bailing step.

In the embodiment shown, a crushing force of approximately 300 tons is applied by press 10 to crush and flatten the body 11 into a laminated sheet metal slab 14. The compact slab 14 is ejected from the press 10 as by hydraulic means 15 and thereby delivered to a hydraulically operated tilt table 16, which is tilted, as by an operator 17, to transfer the slab 14 onto conveyor 18. The conveyor 18 carries slab 14 into the shearing housing 19 where shear 20 cuts slab 14 into a plurality of longitudinal slabs 14a. In the embodiment shown, the longitudinal slabs 14a may be approximately 8 inches wide.

The longitudinal slabs 14a are directed into chutes 21 where shearing unit 22 cuts the longitudinal slabs 14a into a plurality of scrap metal segments 14b. The segments 14b, in the embodiment shown, may be approximately 8 inches by 7 inches by 4 inches in dimension.

The segments 14b are discharged from shearing unit 22 at discharge means 23 from whence the segments drop into the open end of rotating tumbler 24 driven by a power means 25. The tumbler 24 is supported in an inclined position so that the tumbled segments 14b work their way toward tumbler discharge 26. As the segments 14b are being tumbled a cleaning action is effectuated by the combined movement of the plurality of segments toward the tumbler discharge 26. For example, the segments 14b, may travel approximately 16 feet inside the tumbler in approximately 15 minutes.

As there is a continuous feeding of segments 14b to the tumbler 24, there is a continuous discharge of cleaned segments therefrom. Although not shown, it would be possible to also sandblast or otherwise assist the cleaning action at the tumbler.

From the tumbler discharge 26, the segments 14b are carried by a conveyor 28 to the open hatch of a barge 29, or the segments 14b may be otherwise stored in a stock pile or the like prior to delivery to a steel mill or the like.

An operator, or other detection means (not shown), may be located at the conveyor 28 for the removal of foreign material such as die cast or copper.

Thus a method has been described and illustrated for transforming scrap automobile bodies into relatively small segments of scrap metal which may be easily handled and cleaned, and of a scrap metal quality known as No. 1 Bushling or No. 1 Deep Draw Steel. It is to be understood that, while one form of apparatus for practicing the method of this invention has been described, the invention is not in any way limited to the specific apparatus shown but includes within its scope whatever changes come within the appended claims.

It should be further understood that the apparatus for performing the improved method has merely been illustrated diagrammatically and any suitable commercially available equipment may be used. For example, the press may be of the type shown and described in my U.S. Patent No. 2,986,992, dated June 6, 1961, and commercially available from Gravity Baler, Inc. of La Crosse, Wisconsin; and the squaring or stripping shear may be of the type manufactured and sold by Bertsch and Company of Cambridge City, Indiana.

Various modes of carrying out the invention are contemplated as being within the scope of the following claims particularly pointing out and distinctly claiming the subject matter which is regarded as the invention.

I claim:

1. The method of preparing metal scrap which comprises, the steps of forcibly compacting an irregular mass of scrap metal into a substantially rectilinear plate of uniform cross-section throughout, shearing said plate to form a plurality of elongated strips of uniform width, transversely severing each of said elongated strips into a plurality of segments of similar length, and finally abrasively cleaning said segments.

2. The method of claim 1, wherein the step of cleaning said segments consists of the tumbling of a plurality of segments within an enclosure for a predetermined length of time.

3. The method of preparing scrap automobile bodies for a ferrous process which includes the steps of compacting said scrap automobile bodies to form a plate of laminated metal of uniform transverse section throughout its length, cutting said plate into a plurality of longitudinal plates of uniform width, shearing each of said longitudinal plates transversely thereof to form plate segments wherein the length of said segments are substantially equal to the width thereof, and tumbling said plate segments together in a container for abrasive cleaning thereof.

References Cited by the Examiner

UNITED STATES PATENTS

| | | | |
|---|---|---|---|
| Re. 25,268 | 10/62 | Thompson | 100—95 |
| 906,321 | 12/08 | Sperry. | |
| 1,340,137 | 5/20 | Pfister | 83—408 |
| 1,656,063 | 1/28 | Harrison | 100—94 |
| 2,059,229 | 11/36 | Gregg | 100—39 |
| 2,523,258 | 9/50 | Ransohoff | 51—164 |
| 2,986,992 | 6/61 | Patros et al. | 100—218 |
| 3,049,988 | 8/62 | Lindemann et al. | 100—95 |
| 3,126,817 | 3/64 | Thompson | 100—98 |
| 3,129,656 | 4/64 | Judd | 100—98 |
| 3,141,401 | 7/64 | Lindemann et al. | 100—98 |

FOREIGN PATENTS

| | | |
|---|---|---|
| 134,176 | 1/52 | Sweden. |

WALTER A. SCHEEL, *Primary Examiner.*